(12) United States Patent
Kraft

(10) Patent No.: US 6,908,204 B2
(45) Date of Patent: Jun. 21, 2005

(54) FLAT PANEL LUMINAIRE HAVING EMBEDDED LIGHT GUIDES

(75) Inventor: Edward R. Kraft, New York, NY (US)

(73) Assignee: Edward Robert Kraft, New York, NY (US)

( * ) Notice: Subject to any disclaimer, the term of this patent is extended or adjusted under 35 U.S.C. 154(b) by 29 days.

(21) Appl. No.: 10/649,713

(22) Filed: Aug. 26, 2003

(65) Prior Publication Data

US 2004/0042196 A1 Mar. 4, 2004

Related U.S. Application Data

(63) Continuation of application No. 10/066,010, filed on Feb. 2, 2002, now abandoned.

(51) Int. Cl.[7] ............................................... F21V 7/04
(52) U.S. Cl. ..................... 362/31; 362/576; 362/511; 362/330; 385/50; 385/129
(58) Field of Search ..................... 362/31, 576, 511, 362/330, 551, 554, 555, 580, 557–559, 459, 509, 145, 147, 148, 317; 385/15, 31, 39, 45, 50, 51, 129–132, 900, 901, 43; 40/546, 547

(56) References Cited

U.S. PATENT DOCUMENTS

| | | | |
|---|---|---|---|
| 4,105,293 A | | 8/1978 | Aizenberg et al. .......... 350/264 |
| 4,411,490 A | * | 10/1983 | Daniel ......................... 362/557 |
| 4,422,719 A | | 12/1983 | Orcutt ........................ 350/96.3 |
| 4,460,940 A | | 7/1984 | Mori ............................ 362/32 |
| 4,471,412 A | | 9/1984 | Mori ............................ 362/32 |
| 4,528,617 A | | 7/1985 | Blackington ................ 362/32 |
| 4,765,701 A | | 8/1988 | Cheslak ...................... 350/96.1 |
| 4,822,123 A | | 4/1989 | Mori ........................... 350/96.1 |
| 4,843,524 A | | 6/1989 | Krent .......................... 362/127 |
| 4,984,144 A | * | 1/1991 | Cobb et al. .................. 362/31 |
| 5,005,108 A | | 4/1991 | Pristash et al. .............. 362/31 |
| 5,101,325 A | * | 3/1992 | Davenport et al. .......... 362/31 |
| 5,136,480 A | * | 8/1992 | Pristash et al. .............. 362/31 |
| 5,190,370 A | * | 3/1993 | Miller et al. ................. 362/31 |
| 5,197,792 A | * | 3/1993 | Jiao et al. .................... 362/31 |
| 5,222,795 A | | 6/1993 | Hed ............................ 362/32 |
| 5,434,754 A | * | 7/1995 | Li et al. ....................... 362/31 |
| 5,618,096 A | * | 4/1997 | Parker et al. ................ 362/31 |
| 5,671,994 A | * | 9/1997 | Tai et al. ..................... 362/31 |
| 5,695,583 A | | 12/1997 | Van den Bergh et al. ... 156/153 |
| 5,836,669 A | | 11/1998 | Hed ............................ 362/92 |
| 5,890,796 A | * | 4/1999 | Marinelli et al. ........... 362/511 |
| 5,997,148 A | | 12/1999 | Ohkawa ...................... 362/31 |
| 6,036,340 A | * | 3/2000 | Fohl et al. ................... 362/511 |
| 6,164,791 A | | 12/2000 | Gwo-Juh et al. ............ 362/31 |
| 6,210,013 B1 | | 4/2001 | Bousfield .................... 362/92 |
| 6,330,386 B1 | | 12/2001 | Wagner et al. | |

FOREIGN PATENT DOCUMENTS

| | | |
|---|---|---|
| EP | 0 534 140 A1 | 3/1993 |
| EP | 0 544 332 A1 | 6/1993 |
| WO | WO 01/51851 | 7/2001 |

OTHER PUBLICATIONS

"Fiber–Optic Panel Throws Light Evenly," Machine Design, Apr. 16, 1998, vol. 70, No. 7, p. 62.

* cited by examiner

*Primary Examiner*—John Anthony Ward
*Assistant Examiner*—Ismael Negron
(74) *Attorney, Agent, or Firm*—Fish & Neave IP Group of Ropes & Gray LLP; Jeffrey H. Ingerman; Wendy A. Petka

(57) ABSTRACT

A flat panel luminaire includes a light source, which can be remote, an optical light pipe, and a light-emitting panel. The light-emitting panel includes a tapered light-injection zone joined to a light-emitting zone having the embedded irregular tetrahedrally-shaped light guides. The surface and cross-sectional areas of the light guides gradually increase as the light guides extend away from the tapered zone. Methods of illuminating an area using such light guides are also provided.

20 Claims, 4 Drawing Sheets

FLAT PANEL LUMINAIRE HAVING EMBEDDED LIGHT GUIDES

CROSS REFERENCE TO RELATED APPLICATION

This is a continuation of U.S. patent application Ser. No. 10/066,010, filed Feb. 2, 2002 now abandoned, which is incorporated herein by reference.

BACKGROUND OF THE INVENTION

This invention relates to flat panel luminaires having embedded light guides for controlled light extraction. More particularly, this invention relates to flat panel luminaires having embedded light guides of irregular tetrahedral shape.

Numerous applications use optical fibers for illumination. A typical application involves multiple optical fibers or bundles to propagate light to an open end of the fiber. Other applications propagate light along the entire length of a light guide to extract light at intervals rather than provide light at only the terminal end of the fiber. Numerous approaches have been proposed to achieve such interval light extraction from optical light guides or fibers. However, each proposal has disadvantages that limit the application or render it impractical.

For example, a known light guide encloses a wave guide in a transparent sleeve or cladding that contains embedded light-reflecting particles or powders. The transparent sleeve or cladding has an index of refraction greater than the index of refraction of the wave guide. This higher index of refraction causes conversion of a light propagation mode to a cladding mode at the proximal end of the wave guide. This depletes beam intensity as the light traverses the full length of the guide. Furthermore, the suspension of particles or powders within the sleeve can cause excessive absorption of the light within the transmitting medium itself. To attempt to overcome the lack of light extraction control, discontinuities, such as cuts or air bubbles, which disperse the propagating light, are included at regular intervals. The introduction of these discontinuities at regular intervals along the core can be difficult to produce and may not allow for continuous light extraction.

Another known type of light guide uses a light transmission element containing light diffusing layers or elements. The diffusing layers are convex or concave and are used to extract light at a specific wavelength. The light diffusing layers can be arranged such that all layers have increasing density (but constant thickness) toward the distal end of the transmitting medium. This light guide uses discrete diffusing elements without consideration of the quantitative light extraction capabilities of these elements.

In another known light guide, the number of light scattering elements increases toward the distal end of the light conductor. The disadvantages of this and the previous light extraction device include discontinuity of the light sources and difficulty in correctly spacing and sizing the extraction elements to provide controlled light extraction from the light guide. Furthermore, the manufacturing and assembly of these devices is awkward and costly.

Another known device also uses discrete elements to extract light from an optical fiber in conjunction with a light panel. This device uses angular recesses and does not provide means to control quantitatively the light extraction. The result is that illumination from the downstream recesses is progressively lower.

Also known is the use of a "curve-linear" tapering of the cross-sectional area of a fiber optic, wherein the flattened surface is abraded or painted. The tapering of the fiber optic provides a way of illuminating perpendicularly to the face of the distal end of the fiber optic. Additionally, it is known to paint elongated triangular reflective stripes onto a plastic plate. This latter technique does not allow enough area for practical light emission for general illumination. The light injection end in both these known techniques does not provide enough distance for an even light flux and will result in the formation of bright spots at the injection end.

In yet another known device, a matrix of dots is applied on a substantially transparent material. The dots have increased diameters as they lay distal to the light-injecting edge of a flat panel. This method is again limited by the actual area of reflectance.

In sum, known devices and methods generally include two dimensional light propagation over a flat panel in which light output is limited by the area of the reflective coating or treatment.

In view of the foregoing, it would be desirable to provide a flat panel luminaire in which the limitations associated with emitting light along an entire length of a light guide are substantially, if not completely, overcome.

SUMMARY OF THE INVENTION

It is an object of this invention to provide apparatus and methods for extracting light from an edge lit panel in a controlled and continuous manner as light traverses an optical transmitting medium.

It is also an object of this invention to provide apparatus and methods for extracting light in a continuous manner at a predetermined rate as light traverses an optical transmitting medium.

It is further an object of this invention to provide linear light sources having a predetermined relative luminosity as light traverses an optical transmitting medium.

It is a still further object of this invention to provide apparatus and methods in which all received light is extracted along an optical transmitting medium or, alternatively, a residual portion is allowed to be emitted at a distal end of the transmitting medium.

In accordance with the invention, a flat panel luminaire is provided that includes a light-emitting panel having a tapered light-injection area joined to a light-emitting zone. The light-emitting zone is comprised of preferably highly transmissive plastic or glass in which irregular tetrahedrally-shaped grooves (i.e., light guides) are embedded. The grooves have a surface area on two sides that gradually increase from the edge of the light-injection area to the distal end of the light-emitting zone. The amount of the light emitted is determined by the surface area and reflectance of the grooves.

The luminaire of the invention also includes a light source, which can be remote, and an optical light pipe transporting light flux from the light source to the light-emitting panel.

The luminaire of the invention advantageously provides continuous light extracted from the light guides in a controlled manner. The luminaire of the invention can advantageously replace fluorescent and other types of luminaires whose applications may be limited by space restrictions, heat production, maintenance requirements, or other limitations associated with common light sources.

Methods of illumination in accordance with the invention are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
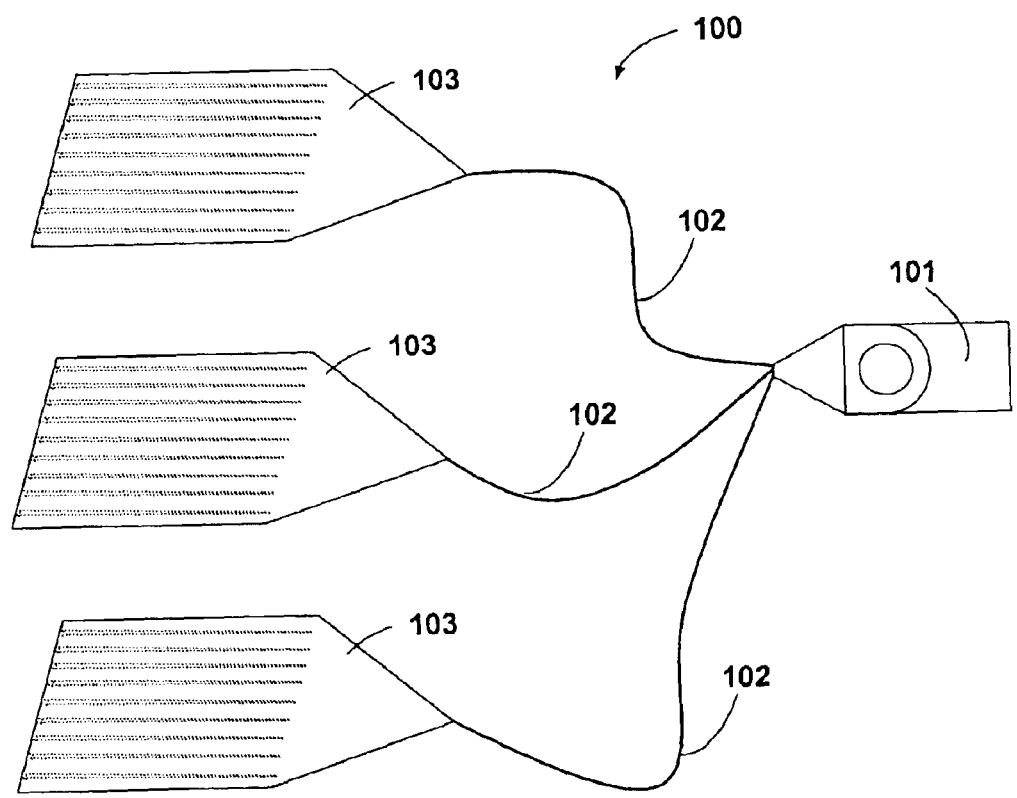
FIG. 1 is simplified block diagram of a flat panel luminaire system in accordance with the invention.

FIG. 1 shows a flat panel luminaire system 100 in accordance with invention. Luminaire system 100 includes a light source 101, multiple optical light pipes 102, and respective multiple light-emitting panels 103. Light source 101 generates a light flux, can be remote from the light-emitting panels 103, and can be any light source including, for example, a linear light source with a predetermined relative luminosity. Optical light pipes 102 transport light flux from light source 101 to an injection point on respective light panels 103.

Figure 2:
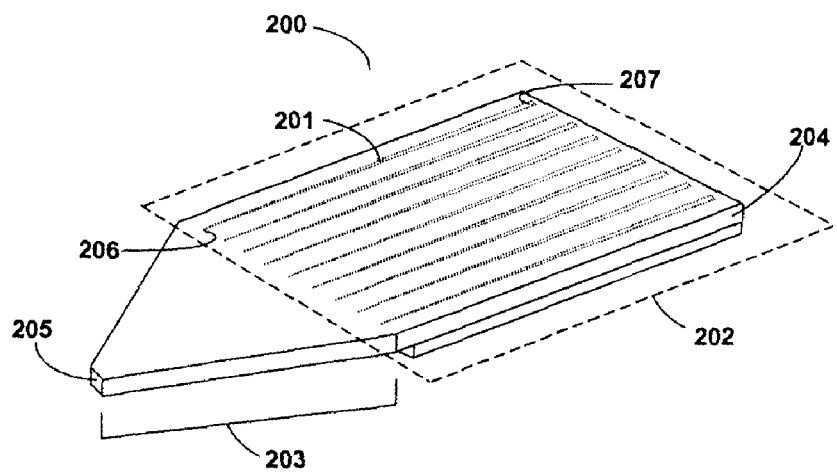
FIG. 2 is a simplified perspective view of a light-emitting panel in accordance with the invention.

FIG. 2 shows light-emitting panel 200 in accordance with the invention. Panel 200 has two general areas—a tapered light-injection area 203 and a light-emitting zone 202. Light-emitting zone 202 may be rectangular in shape and includes preferably a plurality of embedded light guides 201, which are described further below. Panel 200 is generally flat and has a base 204 made of plastic or glass that has a transmittance of preferably at least about 91% and a refractive index of preferably between 1.49 and 1.51. In a more preferred embodiment, base 204 is made of clear polymethylmethacrylate (PMMA). The inherent properties of materials used to form base 204 may limit luminaire operation under conditions involving humidity, chemical environment, and temperature. Conversely, suitable base materials having the optical properties described above may allow the luminaire to be advantageously used under extreme conditions, such as, for example, in outer space.

Light-emitting panel 200 operates as follows: light flux from a light source (e.g., light source 101) enters tapered light-injection area 203 at narrow end 205 via an optical light pipe or fiber (e.g., optical light pipe 102). Tapered light-injection area 203 serves as a coupling area from an optical light pipe to light-emitting zone 202. Narrow end 205 is sized and shaped to preferably match the size and shape of the transporting light pipe or fiber, while the wide end of area 203 is sized and shaped to preferably match the size and shape of the end of light-emitting zone 202 proximate the light-injection area. The light flux that enters the light-injection area from the light pipe or fiber is highly organized. The light-injection area should be of sufficient length to preserve the light source radiant flux density over the area from narrow end 205 to the proximal end of light-emitting zone 202. The light flux is evenly averaged and distributed across the proximal end of the light-emitting zone by total internal reflection. Additionally, the tapered light-injection area may be bent over a radius of 10 times one-half its thickness or greater. Once the light enters light-emitting zone 203 and embedded light guides 201, both reflection and refraction modes of light propagation occur.

As shown in FIG. 2, light-emitting zone 202 has at least one embedded irregular tetrahedrally-shaped light guide 201. Light guide 201 extends continuously from an end 206 proximate light-injection area 203 to a distal end 207 of light-emitting zone 202. The multiple embedded irregular tetrahedron light guides may be arranged in parallel with respect to each other, depending on the intended application. Light travels from light-injection area 203 to the proximal end of light-emitting zone 202, from which a portion of light propagates through base 204 and another portion propagates through light guides 201 in a direction generally towards distal end 207. Light is emitted from panel 200 in a direction transverse to the propagation direction such that an area exposed to the light-emitting panel is illuminated continuously along the length of the light-emitting zone.

Figure 3:
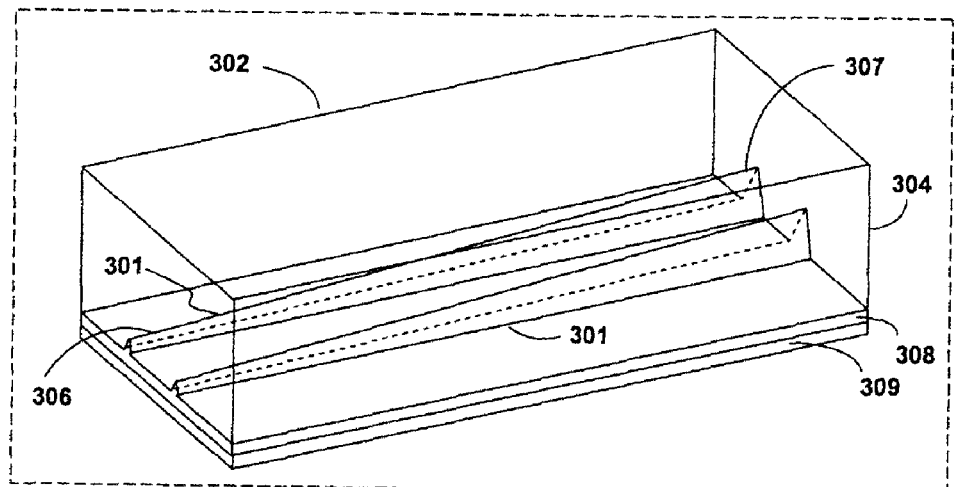
FIG. 3 is a simplified enlarged perspective view of a portion of a light-emitting panel in accordance with the invention.

Referring to FIG. 3, light-emitting zone 302 further comprises a room temperature vulcanized (RTV) silicone layer 308 and a mirror layer 309. Silicone layer 308 forms an interface with the plastic or glass layer 304, which has light guides 301 embedded in it. Light guides 301 are cast or machined into the base layer 304. Mirror layer 309 forms an interface with silicone layer 308. These two layers act as additional reflective layers. In a preferred embodiment of the invention, silicone layer 308 has a refractive index of about 1.4. Light guide 301 extends continuously from an end 306 proximate the light-injection area to a distal end 307 of light-emitting zone 302.

Figure 4:
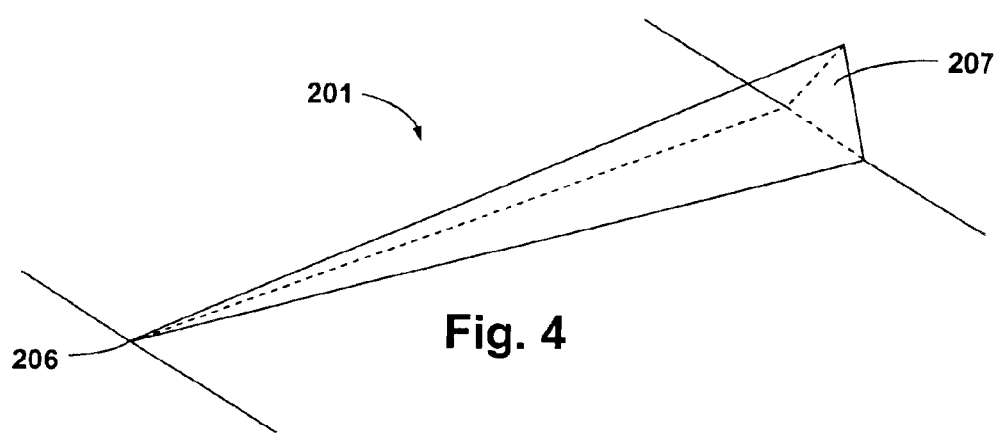
FIG. 4 is a simplified perspective view of an irregular tetrahedrally-shaped groove used to form an embedded light guide in accordance with the invention.

FIG. 4 shows an irregular tetrahedrally-shaped groove used to form the light guides of the invention in the base layer (not shown) of the light-emitting zone.

Figure 5:
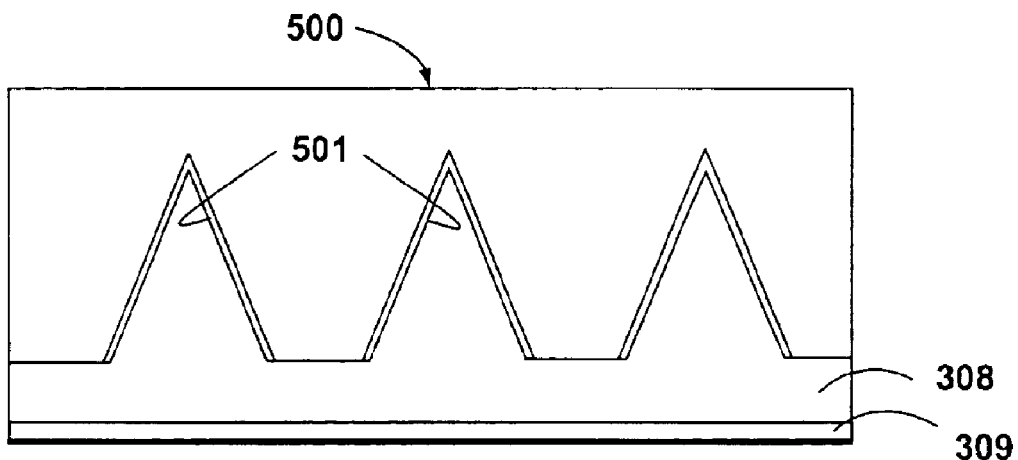
FIG. 5 is a simplified lateral cross-sectional view of embedded tetrahedron light guides.

FIG. 5 illustrates a cross section 500 of the light-emitting zone with the irregular tetrahedrally-shaped light guides having interior surfaces 501. Surfaces 501 are preferably treated with a reflective material in accordance with the invention. In a preferred embodiment of the invention, the reflective material is a highly reflective paint. In another embodiment, interior surfaces 501 may have additional smaller surfaces introduced to provide additional surface area for light diffusion and emission. In still another embodiment, the interior surfaces may be abraded, etched, chemically treated, silk screened, or laminated.

Figure 6:
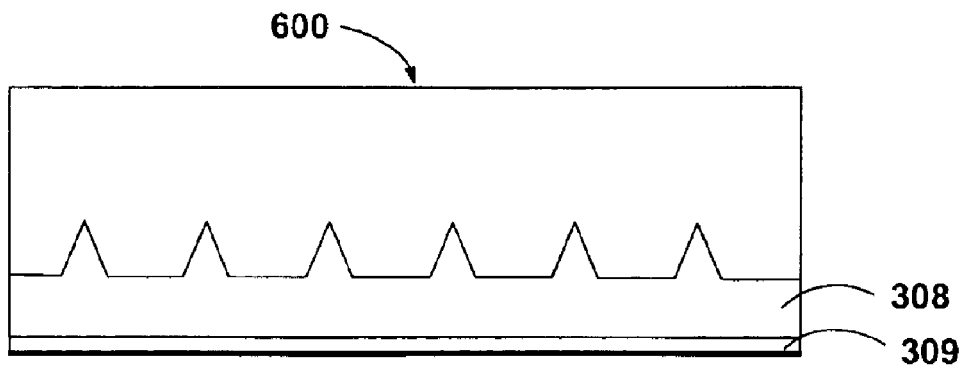
FIG. 6 is a simplified lateral cross-sectional view of embedded tetrahedron light guides taken proximate the light-injection area.

FIG. 6 shows a cross-section 600 of the light-emitting zone when viewed from its proximal end (i.e., near the light-injection area). Note the small cross-sectional areas of the light guide grooves.

Figure 7:
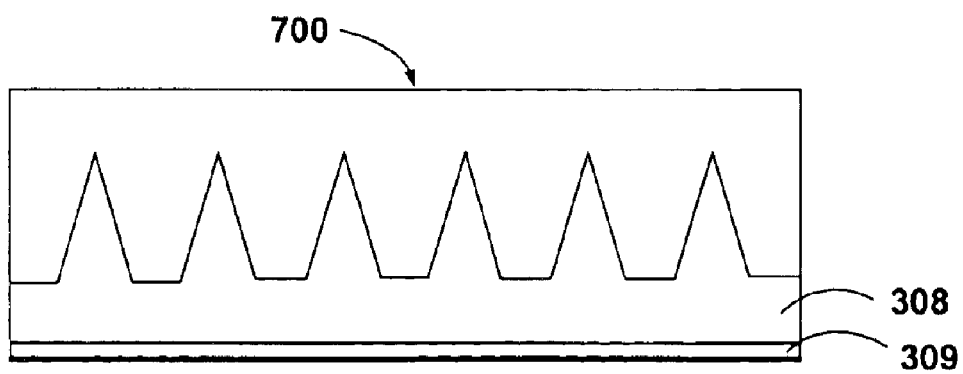
FIG. 7 is a simplified lateral cross-sectional view of embedded tetrahedron light guides taken distal the light-injection area.

FIG. 7 shows a cross-section 700 of the light-emitting zone when viewed from the distal end of the light-emitting zone. Note the large cross-sectional areas of the light guide grooves.

Light emitted from the luminaire of the invention can come directly from the light-injection area through the base layer or from light reflected up from the mirror layer and then through the base layer.

The invention also provides a method for illuminating an area. The method for illuminating an area includes generating a light flux from a light source, transporting the light flux from the light source to a tapered enclosure (e.g., light-injection area 203), and propagating the light flux through a tetrahedrally-shaped groove in which the surface area of the groove increases in the direction of light flux propagation. This method, in accordance with the invention, results in a substantial and continuous emanation of light in a direction transverse to the groove along substantially the entire length of the groove.

The invention is particularly useful for general or task lighting in applications that normally use fluorescent, filament, or arc-type light bulbs. For example, the luminaire can be surface mounted or hung and the luminaire can be fashioned to fit into existing or new "T" grid drop ceilings for use in residential or commercial office lighting. Furthermore, because the light panels have no parts that can wear out and thus require replacement, they can be permanently sealed into clean room air plenums. Likewise, luminaires in accordance with the invention are ideal for use in areas that are difficult to access, such as, for example, back lit billboards. Moreover, the light-emitting surface can be advantageously manufactured in very large sections for such applications.

The luminaire of the invention is advantageous with respect to applications where, for example, space restrictions, maintenance access, heat generation, environmental temperatures, moisture sensitivity, explosive ignition and/or crush or explosion due to hypo- or hyperbaric pressures are an issue. Advantageously, the luminaire of the invention can be used in explosive or caustic atmospheres and is generally unaffected by environmental temperatures and pressures to the extent that the base materials are not affected. Moreover, if heat generated from the light source is an issue, the light source of the invention can be located such that generated heat can be discarded to lower air conditioning requirements or can be recycled to provide heat for other uses.

Advantageously, controlled, continuous and uniform luminosity is provided by luminaires of the invention because the light guides provide less reflectance (via smaller surface areas) when received light flux intensity is greatest while providing greater reflectance (via larger surface areas) as the received light flux loses intensity.

Thus it is seen that flat panel luminaires having embedded irregular tetrahedrally-shaped light guides are provided. One skilled in the art will appreciate that the invention can be practiced by other than the described embodiments, which are presented for purposes of illustration and not of limitation, and the invention is limited only by the claims which follow.

I claim:

1. A luminaire comprising:
   a light source;
   at least one optical light pipe having two ends, one said end coupled to said light source; and
   at least one light emitting panel coupled to the other said end of said light pipe, said light emitting panel comprising:
   a tapered light-injection area having a narrow end and a wide end, said narrow end coupled to said light pipe,
   a light-emitting zone having a proximal end and a distal end, said proximal end joined to said wide end, and
   at least one irregular tetrahedrally-shaped light guide embedded in said light-emitting zone, said light guide extending continuously from said proximal end to said distal end and forming a groove that increases in surface area from said proximal end to said distal end.

2. The luminaire of claim 1 further comprising multiple said optical light pipes connected to respective multiple said light emitting panels.

3. The luminaire of claim 1 comprising multiple embedded irregular tetrahedrally-shaped light guides embedded in said light-emitting zone, said multiple light guides arranged in parallel with respect to each other.

4. The luminaire of claim 1 wherein said light guide has a surface that is abraded, etched, chemically treated, silk screened, or laminated.

5. The luminaire of claim 1 wherein said tapered light-injection area is bent over a radius of about 10 times one-half its thickness.

6. The luminaire of claim 1 wherein said light guide has two interior surfaces treated with a reflective material.

7. The luminaire of claim 6 wherein said reflective material is a highly reflective paint.

8. The luminaire of claim 1 wherein said light-emitting zone comprises a mirror layer, a silicone layer, and a base layer, said mirror layer interfacing said silicone layer and said silicone layer interfacing said base layer, said light guide being cast or machined into said base layer.

9. The luminaire of claim 8 wherein said base layer comprises plastic or glass.

10. The luminaire of claim 9 wherein said plastic or glass has a transmittance of at least 91% and a refractive index of between 1.49 and 1.51.

11. A method of illuminating an area, said method comprising:
    generating a light flux from a light source;
    transporting said light flux via an optical light medium to a tapered enclosure of a light-emitting panel; and
    propagating said light flux from said tapered enclosure through a tetrahedrally-shaped groove embedded in said light-emitting panel, said tetrahedrally-shaped groove having a surface area that increases in the direction of said propagating.

12. The method of claim 11 further comprising propagating said light flux from said tapered enclosure through multiple tetrahedrally-shaped grooves embedded in said light-emitting panel, each said tetrahedrally-shaped groove having a surface area that increases in the direction of said propagating.

13. The method of claim 11 further comprising propagating said light flux from said tapered enclosure through multiple tetrahedrally-shaped grooves embedded in said light-emitting panel, said multiple grooves embedded in parallel with respect to each other, each said tetrahedrally-shaped groove having a surface area that increases in the direction of said propagating.

14. The method of claim 11 wherein prior to said propagating said method further comprises casting or machining said tetrahedrally-shaped groove in a base layer of said light-emitting panel.

15. The method of claim 11 wherein prior to said propagating said method further comprises casting or machining said tetrahedrally-shaped groove in a plastic or glass base layer of said light-emitting panel.

16. The method of claim 11 wherein prior to said propagating said method further comprises casting or machining said tetrahedrally-shaped groove in a plastic or glass base layer of said light-emitting panel, said plastic or glass layer having a transmittance of at least 91% and a refractive index of between 1.49 and 1.51.

17. The method of claim 11 wherein prior to said propagating said method further comprises abrading, etching, chemically treating, silk screening, or laminating a surface of said tetrahedrally-shaped groove.

18. The method of claim 11 wherein prior to said transporting said method further comprises bending said tapered area over a radius of about 10 times one-half its thickness.

19. The method of claim 11 wherein prior to said propagating said method further comprises treating two interior surfaces of said tetrahedrally-shaped groove with a reflective material.

20. The method of claim 19 wherein said treating comprises treating two interior surfaces of said tetrahedrally-shaped groove with a highly reflective paint.

* * * * *